(12) United States Patent
Beukema et al.

(10) Patent No.: US 6,601,148 B2
(45) Date of Patent: Jul. 29, 2003

(54) INFINIBAND MEMORY WINDOWS MANAGEMENT DIRECTLY IN HARDWARE

(75) Inventors: Bruce Leroy Beukema, Hayfield, MN (US); David F. Craddock, New Paltz, NY (US); Ronald Edward Fuhs, Rochester, MN (US); Thomas Anthony Gregg, Highland, NY (US); Renato John Recio, Austin, TX (US); Steven L. Rogers, Rochester, MN (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 09/798,295

(22) Filed: Mar. 1, 2001

(65) Prior Publication Data

US 2002/0124117 A1 Sep. 5, 2002

(51) Int. Cl.[7] .............................................. G06F 12/06
(52) U.S. Cl. ....................... 711/153; 711/173; 711/147
(58) Field of Search ................. 711/147–173, 202–220; 709/104–106, 300; 712/13–15; 714/3–5

(56) References Cited

U.S. PATENT DOCUMENTS 5,437,031 A * 7/1995 Kitami ....................... 709/300
5,574,849 A * 11/1996 Sonnier et al. ............... 714/12
5,915,088 A *  6/1999 Basavaiah et al. .............. 1/1
6,314,501 B1 * 11/2001 Gulick et al. ............... 711/153

* cited by examiner

Primary Examiner—Do Hyun Yoo
Assistant Examiner—Nasser Moazzami
(74) Attorney, Agent, or Firm—Duke W. Yee; Mark E. McBurney; Christopher P. O'Hagan

(57) ABSTRACT

A method, system and program for controlling access to memory areas within a computer are provided. The invention comprises placing a first Bind Work Queue Element (WQE) at the head of a work queue, wherein the first Bind WQE defines parameters associated with a first Memory Window. A set of Work Requests is then placed on the work queue, behind the first Bind WQE wherein the work requests invoke operations that access the first Memory Window. A second Bind WQE is then placed on the work queue, behind the first set of Work Requests. This second Bind WQE defines parameters associated with a second Memory Window. A second set of Work Requests is placed on the work queue behind the second Bind WQE and invoke operations that access the second memory window. The Memory Windows can be associated with a common Memory Region and have different addresses and lengths or different access rights. In another embodiment, the first and second Memory Windows can be associated with different Memory Regions.

21 Claims, 6 Drawing Sheets

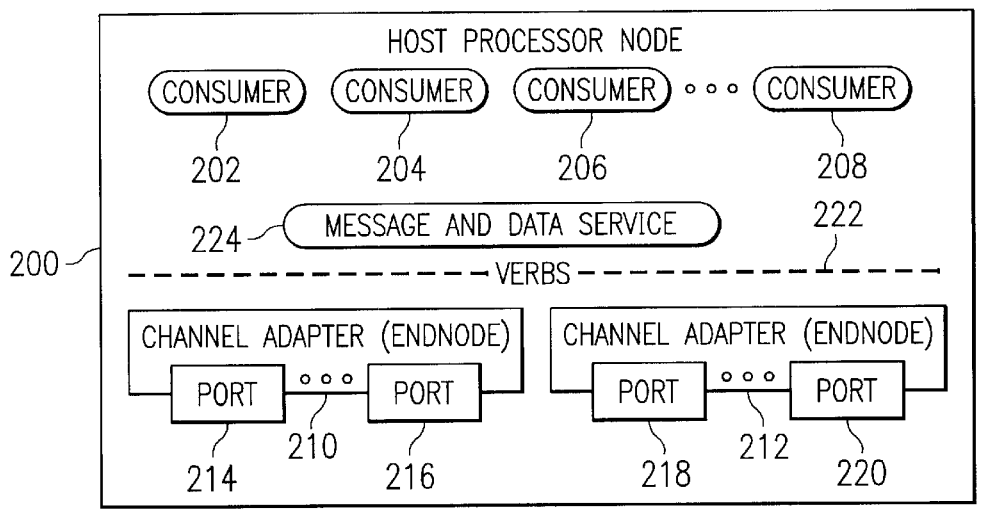
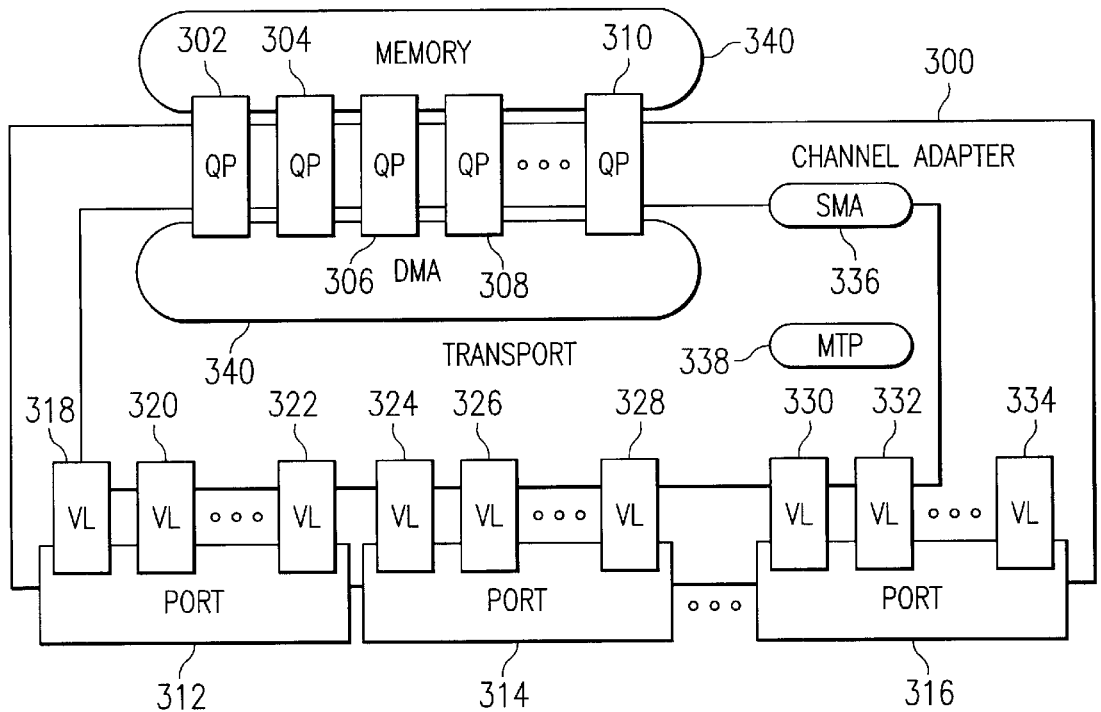

| EXAMPLE R_KEY FORMAT 1100 ||
|---|---|
| BITS | DESCRIPTION |
| 0:15 | KEY INDEX |
| 16:31 | KEY INSTANCE |

INFINIBAND MEMORY WINDOWS MANAGEMENT DIRECTLY IN HARDWARE

BACKGROUND OF THE INVENTION

1. Technical Field

The present invention relates to memory access in computer systems, and more specifically, how to control user access to particular areas of memory.

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

A Memory Region is an area of memory that is contiguous in the virtual address space and for which the translated physical addresses and access rights have been registered with the HCA. A Memory Window is an area of memory within a previously defined Memory Region, for which the access rights are either the same as or a subset of those of the Memory Region.

The normal method for controlling a consumer's access to an area of memory is to de-register and register a Memory Region. This process requires considerable overhead, including kernel intervention, in order to set up the access rights, pinning or unpinning of memory, and setting up the address translation tables. When more dynamic control of a consumer's access to memory is required, a different mechanism is needed. Currently, there is no method to dynamically control the access rights that a consumer is granted to an area of memory without changing the address translation associated with the Memory Region. The ability to dynamically change the access rights requires sequencing with respect to the Work Requests that are accessing the memory. In order to provide the sequencing and integrity of checking required, the requested changes to the access rights need to be checked in the HCA hardware.

Therefore, it would be desirable to have an efficient mechanism for providing both the sequencing and integrity checks for Memory Window management.

SUMMARY OF THE INVENTION

The present invention provides a method, system and program for controlling access to memory areas within a computer. The invention comprises placing a first Bind Work Queue Element (WQE) at the head of a work queue, wherein the first Bind WQE defines parameters associated with a first Memory Window. A set of Work Requests is then placed on the work queue, behind the first Bind WQE wherein the work requests invoke operations that access the first Memory Window. A second Bind WQE is then placed on the work queue, behind the first set of Work Requests. This second Bind WQE defines parameters associated with a second Memory Window. A second set of Work Requests is placed on the work queue behind the second Bind WQE and invoke operations that access the second memory window.

The Memory Windows can be associated with a common Memory Region and have different addresses and lengths or different access rights. In another embodiment, the first and second Memory Windows can be associated with different Memory Regions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a functional block diagram of a host processor node in accordance with a preferred embodiment of the present invention;

FIG. 3 depicts a diagram of a host channel adapter in accordance with a preferred embodiment of the present invention;

DETAILED DESCRIPTION OF THE PREFERRED EMBODIMENT

The present invention provides a distributed computing system having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
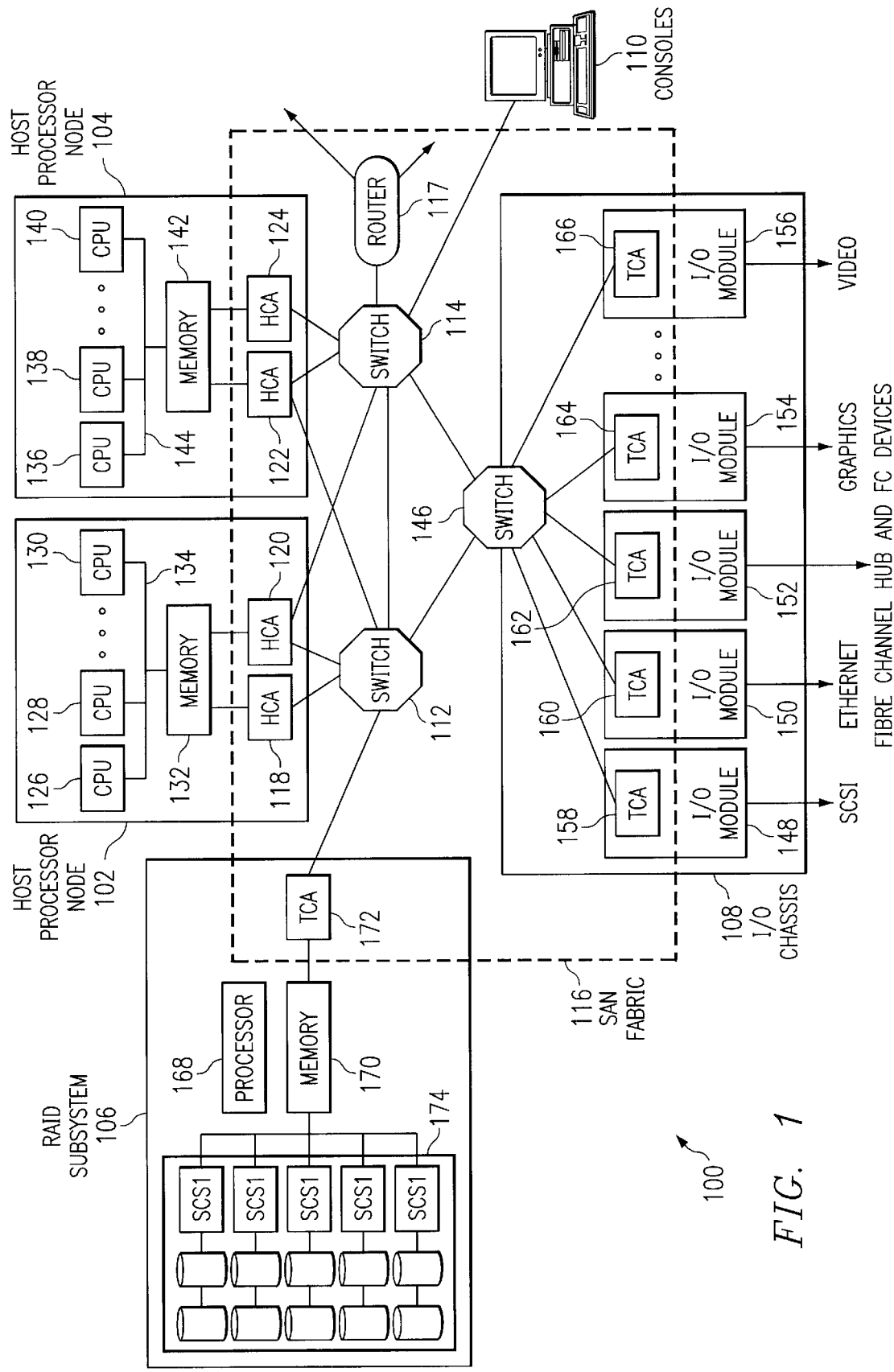
FIG. 1 depicts a diagram of a networked computing system in accordance with a preferred embodiment of the present invention.

With reference now to the figures and in particular with reference to FIG. 1, a diagram of a networked computing system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or packets in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the packets through the SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing packets from one link in a first subnet to another link in a second subnet using a large header Destination Globally Unique Identifier (DGUID).

In one embodiment, a link is a full duplex channel between any two network fabric elements, such as endnodes, switches, or routers. Example of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O chassis 108 in FIG. 1 include an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place Work Requests onto a Work Queue (WQ).

Figure 4:
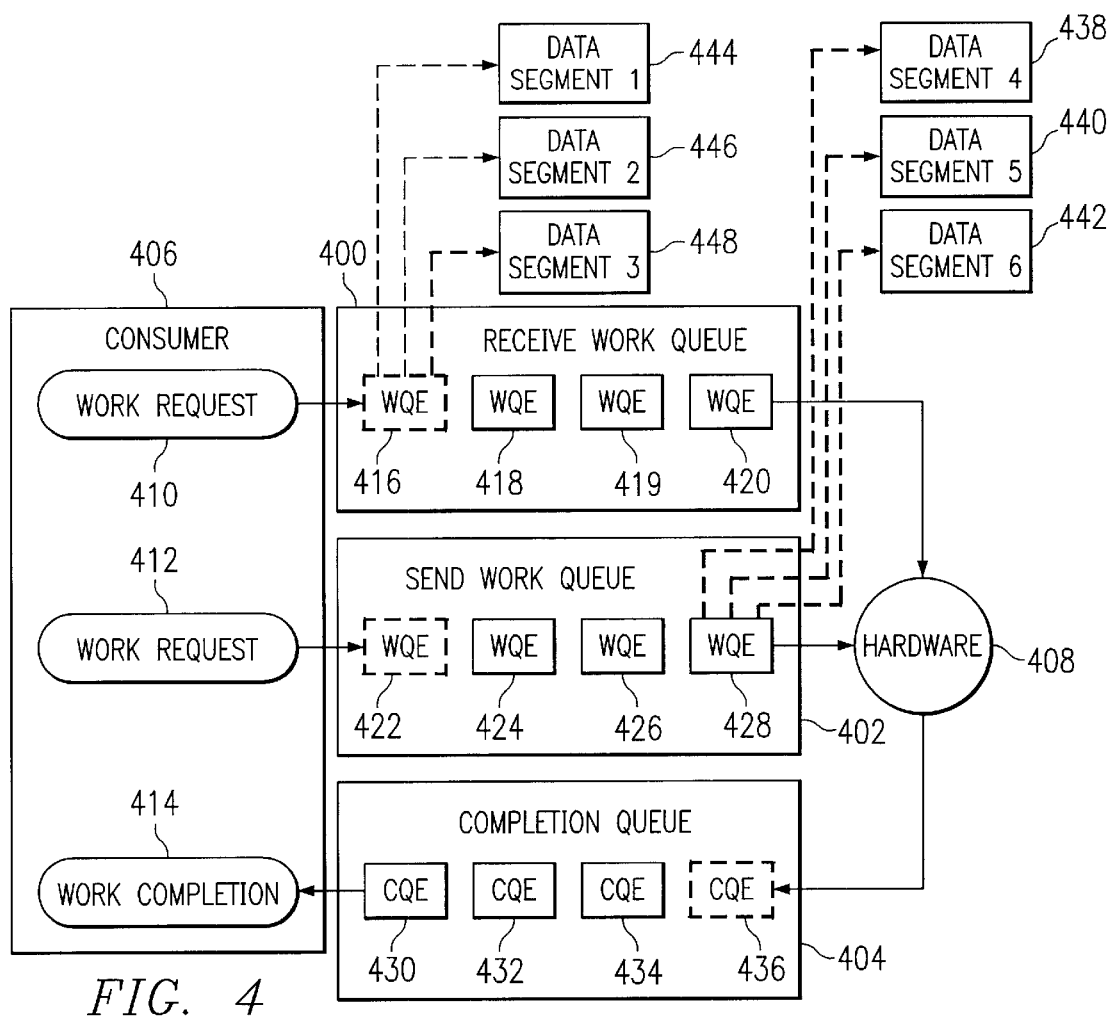
FIG. 4 depicts a diagram illustrating processing of Work Requests in accordance with a preferred embodiment of the present invention.

With reference now to FIG. 4, a diagram illustrating processing of Work Requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates Work Requests 410 and 412 and receives work completion 414. As shown in FIG. 4, Work Requests placed onto a work queue are referred to as Work Queue Elements (WQEs) Send work queue 402 contains Work Queue Elements (WQEs) 422–428, describing data to be transmitted on the SAN fabric. Receive work queue 400 contains WQEs 416–420, describing where to place incoming channel semantic data from the SAN fabric. A WQE is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed Work Queue Elements. Completion queue 404 is used to create a single point of completion notification for multiple queue pairs. A completion queue element is a data structure on a completion queue. This element describes a completed WQE. The completion queue element contains sufficient information to determine the queue pair and specific WQE that completed. A completion queue context is a block of information that contains pointers to, length, and other information needed to manage the individual completion queues.

Example Work Requests supported for the send work queue 402 shown in FIG. 4 are as follows. A send Work Request is a channel semantic operation to push a set of local data segments to the data segments referenced by a remote node's receive WQE. For example, WQE 428 contains references to data segment 4 438, data segment 5 440, and data segment 6 442. Each of the send Work Request's data segments contains a virtually contiguous Memory Region. The virtual addresses used to reference the local data segments are in the address context of the process that created the local queue pair.

A Remote Direct Memory Access (RDMA) Read Work Request provides a memory semantic operation to read a virtually contiguous memory space on a remote node. A memory space can either be a portion of a Memory Region or portion of a Memory Window. A Memory Region references a previously registered set of virtually contiguous memory addresses defined by a virtual address and length. A Memory Window references a set of virtually contiguous memory addresses which have been bound to a previously registered region.

The RDMA Read Work Request reads a virtually contiguous memory space on a remote endnode and writes the data to a virtually contiguous local memory space. Similar to the send Work Request, virtual addresses used by the RDMA Read WQE to reference the local data segments are in the address context of the process that created the local queue pair. For example, WQE 416 in receive work queue 400 references data segment 1 444, data segment 2 446, and data segment 3 448. The remote virtual addresses are in the address context of the process owning the remote queue pair targeted by the RDMA Read WQE.

A RDMA Write WQE provides a memory semantic operation to write a virtually contiguous memory space on a remote node. The RDMA Write WQE contains a gather list of local virtually contiguous memory spaces and the virtual address of the remote memory space into which the local memory spaces are written.

A RDMA FetchOp WQE provides a memory semantic operation to perform an atomic operation on a remote word. The RDMA FetchOp WQE is a combined RDMA Read, Modify, and RDMA Write operation. The RDMA FetchOp WQE can support several read-modify-write operations, such as Compare and Swap if equal.

A bind (unbind) remote access key (R_Key) WQE provides a command to the host channel adapter hardware to modify (destroy) a Memory Window by associating (disassociating) the Memory Window to a Memory Region. The R_Key is part of each RDMA access and is used to validate that the remote process has permitted access to the buffer.

In one embodiment, receive work queue 400 shown in FIG. 4 only supports one type of WQE, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth low-latency communication.

The mechanism that is used to provide the HCA hardware with the information required to change the access rights of a Memory Window is called a Bind Memory Window. A WQE that defines the parameters associated with a Memory Window is placed on a work queue.

Figure 5:
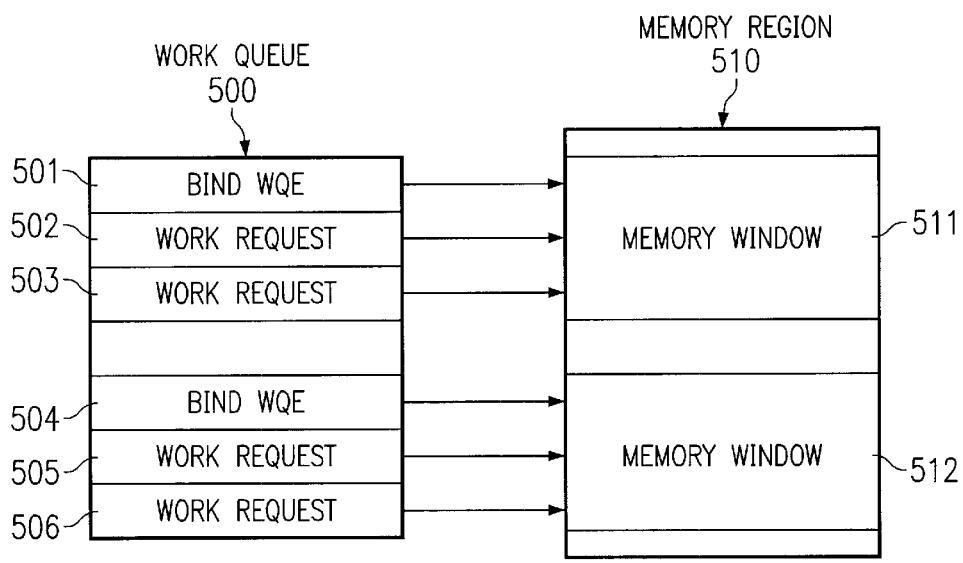
FIG. 5 depicts a diagram illustrating a Bind Memory Window in accordance with the present invention.

Referring now to FIG. 5, a diagram illustrating a Bind Memory Window is depicted in accordance with the present invention. The Bind WQE 501 at the head of the Work Queue 500 defines the characteristics of Memory Window 511. Work Requests 502 and 503 then invoke operations that access Memory Window 511. These operations could be remote accesses such as RDMA, where Work Request 502 could inform the remote node, the virtual address, and the R_Key associated with Memory Window 511, to use the RDMA operation. When there will be no more accesses of Memory Window 511, new characteristics could be defined, as depicted by Memory Window 512. This is achieved by placing the Bind WQE 504 for Memory Window 512 on the Work Queue 500 following Work Requests 502 and 503. The example illustrates Memory Window 512 having a different starting address and length from Window 511, and belonging to the same Memory Region 510. The address and length could remain the same and only the access rights be changed, or the window could be associated with a different Memory Region. Work Requests 505 and 506, which follow the Bind WQE 504 for Memory Window 512, then invoke operations that cause access to Memory Window 512.

The requirement for sequencing of Memory Window processing is achieved by placing the Bind WQEs and on the Work Queue in the relationship required with the Work Requests. The HCA hardware processes the Work Requests and Binds in the same order as which they occur on the Work Queue. The characteristics of the Memory Windows and Memory Regions are stored in Protection Table Entries (PTEs) that are entries in the Protection Table. These entries are accessed by using the index portion of the R_Key or local access key (L_Key) to index into the Protection Table.

Figures 6, 11:
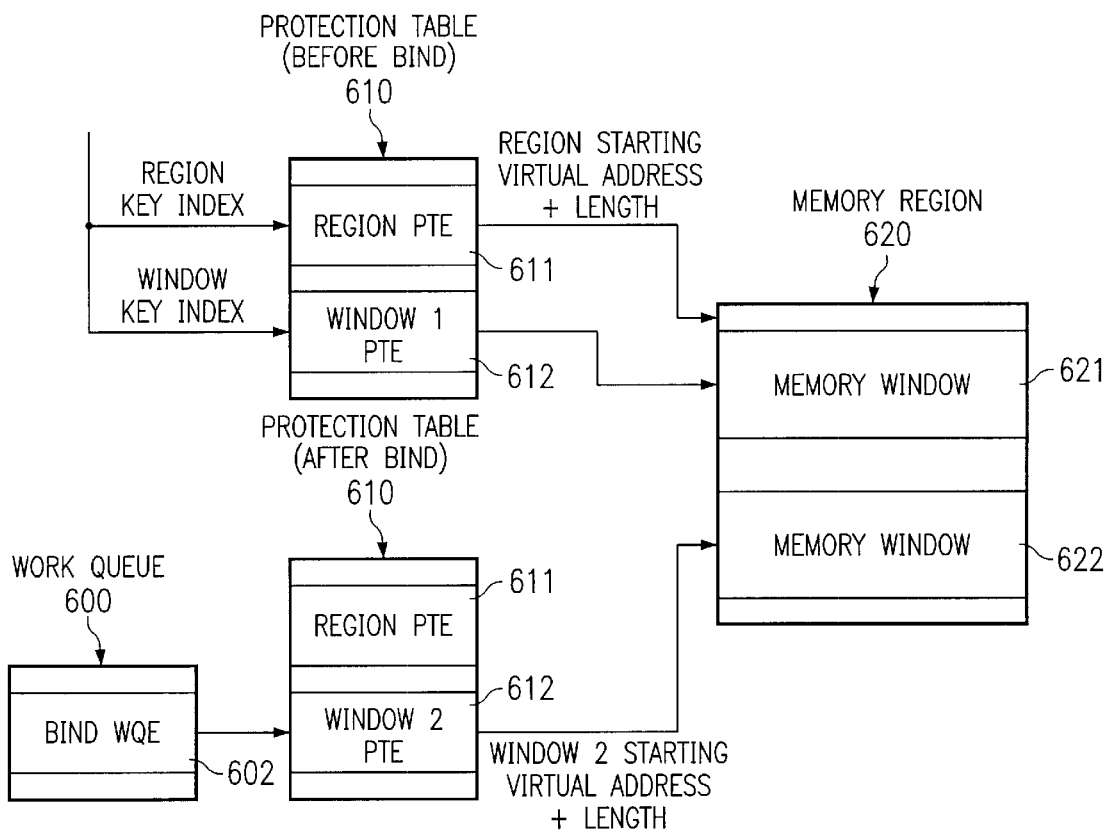
FIG. 6 depicts a diagram illustrating Bind Memory Window processing in accordance with the present invention.
FIG. 11 depicts a table illustrating the format of an R_Key in accordance with the present invention.

Referring to FIG. 6, a diagram illustrating Bind Memory Window processing is depicted in accordance with the present invention. Prior to the Bind WQE 602 associated with Memory Window 622 being processed, the index portion of the R_Key references PTE 612 in the Protection Table that defines the characteristics of Memory Window 621. Bind WQE 602 is placed on the Work Queue 600 to provide access to Memory Window 622. After Bind WQE 602 is processed, the same PTE 612 that is referenced by the index portion of the R_Key, which previously defined the characteristics of Memory Window 621, now defines the characteristics of Memory Window 622. The information that defines the characteristics of Memory Window 622 is provided by Bind WQE 602.

Figure 7:
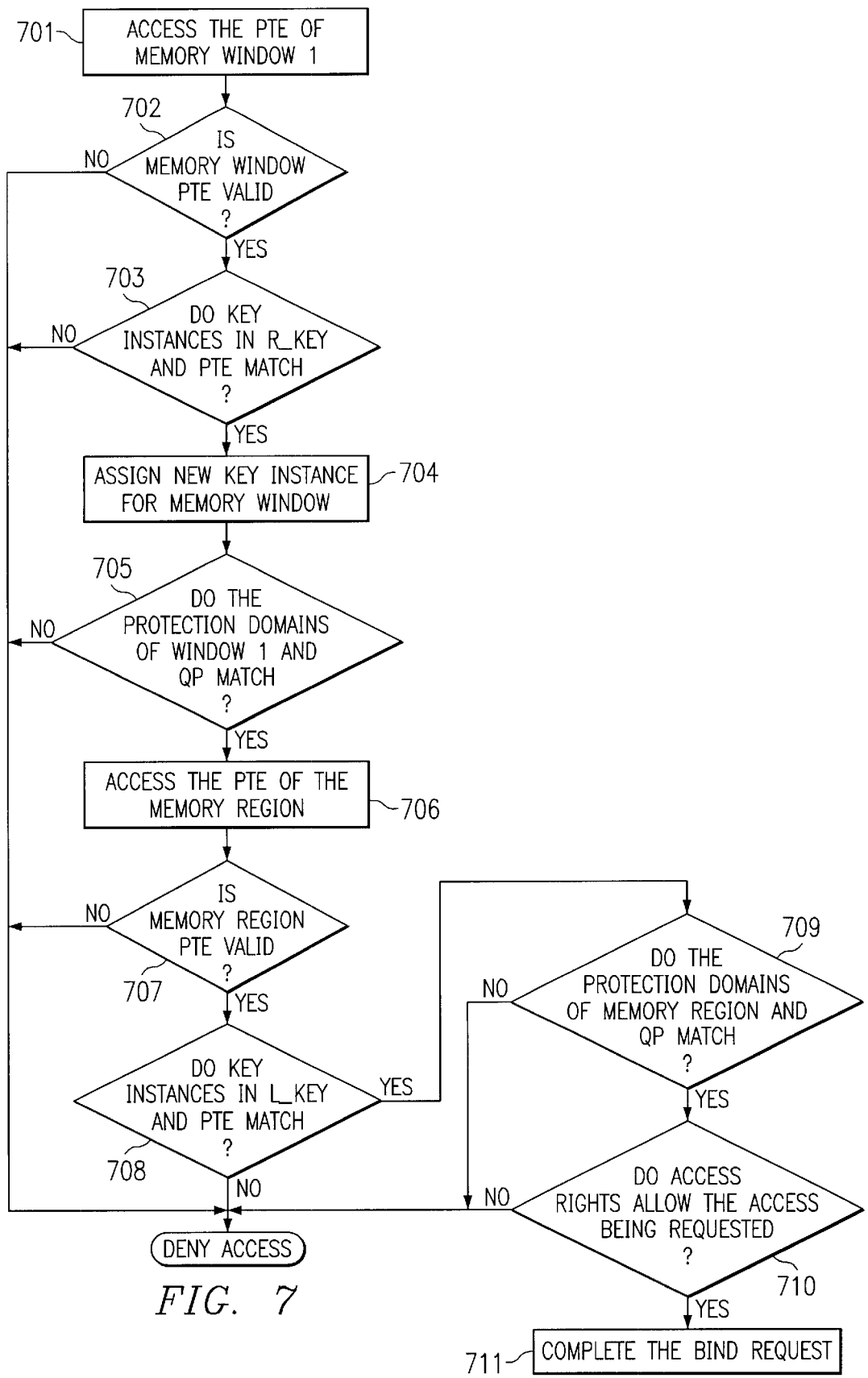
FIG. 7 depicts a flowchart illustrating the steps by which the HCA hardware processes the Bind Memory Window WQE on the Work Queue in accordance with the present invention.

Referring now to FIG. 7, a flowchart illustrating the steps by which the HCA hardware processes the Bind Memory Window WQE on the Work Queue in accordance with the present invention. If any of the checks fail, the Bind fails, and any Work Request that tries to use the R_Key associated with Window 2 is not allowed access. The HCA uses the Key Index provided in the current R_Key field in the Bind WQE to access the PTE of Window 1 (step 701), and checks that it is a valid PTE (step 702). Next, the HCA hardware checks that the Key Instance provided in the current R_Key in the WQE matches the Key Instance stored in the PTE of Window 1 (step 703). A new Key instance for this Memory Window is then assigned and combined with the Key Index provided in the current R_Key to form a new R_Key (step 704). The new value of the Key Instance must not be equal to the previous value. The Protection Domain in the PTE of Window 1 is checked to make sure it matches the Protection Domain associated with the QP on which the WQE is placed (step 705).

The Key Index provided in the L_Key of the Memory Region in the Bind WQE is then used to access the PTE of the Memory Region to which the Window will be bound (step 706) and check that the PTE is valid (step 707). The HCA hardware then checks that the Key Instance provided in the L_Key of the Memory Region in the WQE matches the Key Instance stored in the PTE of the Memory Region (step 708). The Protection Domain in the PTE of the Memory Region is checked to make sure it matches the Protection Domain associated with the QP on which the WQE is placed (step 709). The HCA then checks that the access rights specified for the Memory Region allow the access requested in the Bind WQE (step 710). For example, if the Bind specifies remote write access, the Memory Region must have local and remote write access, and Memory Window binding must be enabled. As another example, if the Bind specifies remote read access, the Memory Region must have remote read access, and Memory Window binding must be enabled. The virtual address and length specified in the Bind WQE must fall within the bounds of the Memory Region specified by the virtual address and length contained in the Memory Region's PTE. If all of the preceding checks complete without error, the HCA completes the bind processing by over-writing the PTE of Window 1 with the PTE for Window 2 (step 711). The new R_Key that was derived in step 704 is returned to the consumer to be used in a subsequent Work Request.

Figure 8:
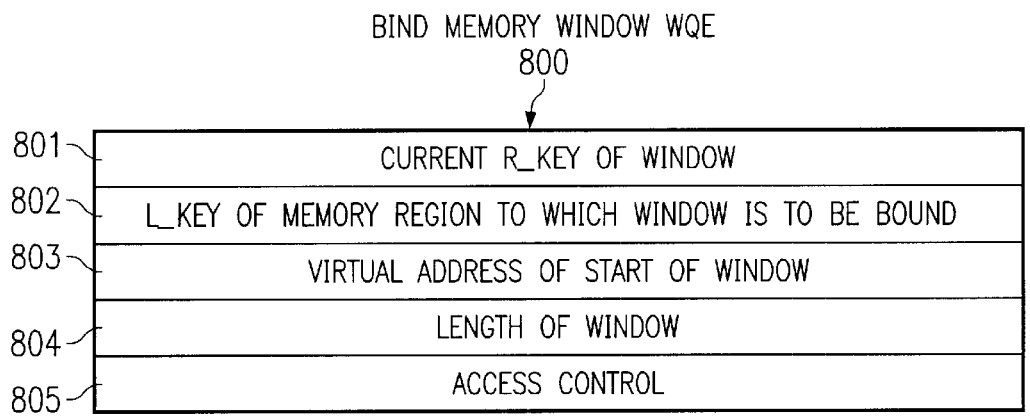
FIG. 8 depicts a table illustrating the format of the Bind Memory Window WQE in accordance with the present invention.

Referring to FIG. 8, a table illustrating the format of the Bind Memory Window WQE is depicted in accordance with the present invention. This WQE 800 provides the HCA hardware with all the information that is needed to process and validate the request to change the characteristics of the Memory Window. The Current R_Key 801 of the window is used to access the current characteristics of the Window as defined in the Window's PTE. The L_Key 802 of the Memory Region is used to access the characteristics of the Memory Region to which the Window will be bound. The virtual address 803 and length 804 define the bounds of the new Window, and the HCA hardware checks that the virtual address and length fall within the bounds of the Memory Region, which is defined in the Memory Region's PTE. The Access Control 805 specifies the requested access rights of the new Window, which the HCA hardware compares against the access rights of the Memory Region, as defined in the Memory Region's PTE.

Figure 9:
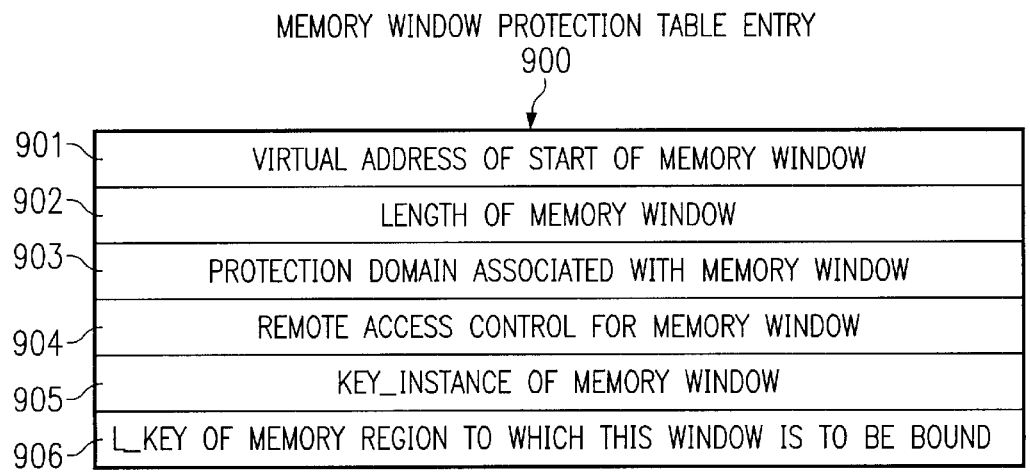
FIG. 9 depicts a table illustrating the format of the Memory Window PTE in accordance with the present invention.

Referring now to FIG. 9, a table illustrating the format of the Memory Window PTE is depicted in accordance with the present invention. The Memory Window PTE 900 defines the characteristics of the Memory Window and is used to determine if the Bind Request has the right to modify the characteristics of the Window, as well as determine if a memory access has the required access rights.

The virtual address 901 and length 902 define the bounds of the Memory Window. The Protection Domain 903 is used to correlate the access between the Memory Window, the Memory Region and the Queue Pair associated with the Work Request. The Remote Access Control 904 defines the access rights for this Memory Window (e.g. remote write access is permitted). The Key_Instance 905 is used to control accesses when Windows are re-bound. It is checked when a Bind is processed to see if the consumer has the right to change the Characteristics of the Memory Window. The L_Key 906 of the Memory region is used to access the Memory Region's PTE which defines the characteristics of the Memory Region and also, either directly or indirectly, references the Address Translation Tables that define the virtual-to-real address mappings for the Memory Region.

Figure 10:
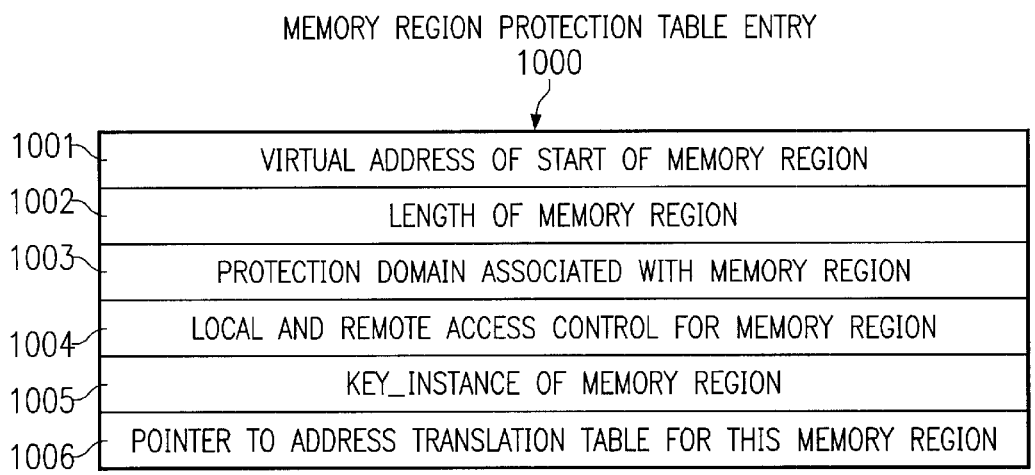
FIG. 10 depicts a table illustrating the format of the Memory Region PTE in accordance with the present invention.

Referring to FIG. 10, a table illustrating the format of the Memory Region PTE is depicted in accordance with the present invention. The Memory Region PTE 1000 defines the characteristics of the Memory Region and is used to determine if the Bind Request has the right to access the Memory Region.

The virtual address 1001 and length 1002 define the bounds of the Memory region. The Memory Window must fall within these bounds. The Protection Domain 1003 is used to correlate the access between the Memory Window, the Memory Region and the Queue Pair associated with the Work Request. The Access Control 1004 defines the access rights for this Memory Region (e.g. Memory Window binding is permitted). The Key_Instance 1005 is used to check if the bind request has the right to access this Memory Region. The Pointer 1006 to the Address Translation Table references the Address Translation Table that defines the virtual-to-real address mappings for the Memory Region.

The Bind Memory Window processing has no impact on the address translation process. Address translation is based on the Memory Region, and a Memory Window uses the Address Translation Tables that have already been set up for the Memory Region to which the Window belongs.

Referring now to FIG. 11, a table illustrating the format of an R_Key is depicted in accordance with the present invention. The R_Key 1100 that is used to reference the Memory Window is comprised of two components: the number of bits assigned to each component and their location are implementation dependent. The Key Index 1101 is used to locate an entry the Protection Table, and thus obtain the PTE of the Memory Window or Memory Region. The Key Instance 1102 is compared with the Key Instance stored in the PTE to check whether the R_Key 1100 that is being used to access the memory is allowed to access that Region or Window. This is useful when Regions are re-registered or when Windows are re-bound.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling access to memory areas within a computer, comprising:

placing a first bind work queue element at the head of a work queue, wherein the first bind work queue element defines parameters associated with a first memory window;

placing a first plurality of work requests on the work queue, behind the first bind work queue element, wherein the work requests invoke operations that access the first memory window;

placing a second bind work queue element on the work queue, behind the first plurality of work requests, wherein the second bind work queue element defines parameters associated with a second memory window; and placing a second plurality of work requests on the work queue behind the second bind work queue element, wherein the work requests invoke operations that access the second memory window.

2. The method according to claim 1, wherein the first and second memory windows are associated with a common memory region.

3. The method according to claim 2, wherein the first and second memory windows have different starting addresses and lengths.

4. The method according to claim 2, wherein the first and second memory windows have different access rights.

5. The method according to claim 1, wherein the first and second memory windows are associated with different memory regions.

6. The method according to claim 1, further comprising storing the characteristics of the first and second memory windows as entries within a protection table.

7. The method according to claim 6, further comprising storing the characteristics of a first memory region as entries within the protection table.

8. The method according to claim 7, further comprising storing the characteristics of a second memory region as entries within the protection table.

9. The method according to claim 6, wherein:
the protection table is accessed by means of a remote access key; and
the entries are accessed by means of an index portion of the remote access key.

10. The method according to claim 6, wherein:
the protection table is accessed by means of a local access key; and
the entries are accessed by means of an index portion of the local access key.

11. A computer program product for use in a data processing system, for controlling access to memory areas within a computer, the computer program product comprising:
first instructions for placing a first bind work queue element at the head of a work queue, wherein the first bind work queue element defines parameters associated with a first memory window;
second instructions for placing a first plurality of work requests on the work queue, behind the first bind work queue element, wherein the work requests invoke operations that access the first memory window;
third instructions for placing a second bind work queue element on the work queue, behind the first plurality of work requests, wherein the second bind work queue element defines parameters associated with a second memory window; and
fourth instructions for placing a second plurality of work requests on the work queue behind the second bind work queue element, wherein the work requests invoke operations that access the second memory window.

12. The computer program product according to claim 11, wherein the first and second memory windows are associated with a common memory region.

13. The computer program product according to claim 12, wherein the first and second memory windows have different starting addresses and lengths.

14. The computer program product according to claim 12, wherein the first and second memory windows have different access rights.

15. The computer program product according to claim 11, wherein the first and second memory windows are associated with different memory regions.

16. The computer program product according to claim 11, further comprising storing the characteristics of the first and second memory windows as entries within a protection table.

17. The computer program product according to claim 16, further comprising storing the characteristics of a first memory region as entries within the protection table.

18. The computer program product according to claim 17, further comprising storing the characteristics of a second memory region as entries within the protection table.

19. The computer program product according to claim 16, wherein:
the protection table is accessed by means of a remote access key; and
the entries are accessed by means of an index portion of the remote access key.

20. The computer program product according to claim 16, wherein:
the protection table is accessed by means of a local access key; and
the entries are accessed by means of an index portion of the local access key.

21. A system for controlling access to memory areas within a computer, comprising:
a first queuing component to place a first bind work queue element at the head of a work queue, wherein the first bind work queue element defines parameters associated with a first memory window;
a second queuing component to place a first plurality of work requests on the work queue, behind the first bind work queue element, wherein the work requests invoke operations that access the first memory window;
a third queuing component to place a second bind work queue element on the work queue, behind the first plurality of work requests, wherein the second bind work queue element defines parameters associated with a second memory window; and
a fourth queuing component to place a second plurality of work requests on the work queue behind the second bind work queue element, wherein the work requests invoke operations that access the second memory window.

* * * * *